April 1, 1941.  W. COOK  2,237,133
MINING DRILL AND BIT
Original Filed Feb. 21, 1936   3 Sheets-Sheet 1
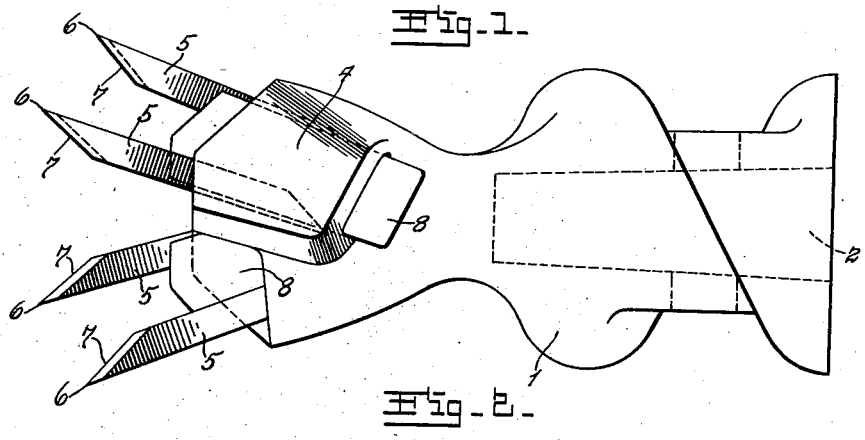
Fig. 1.
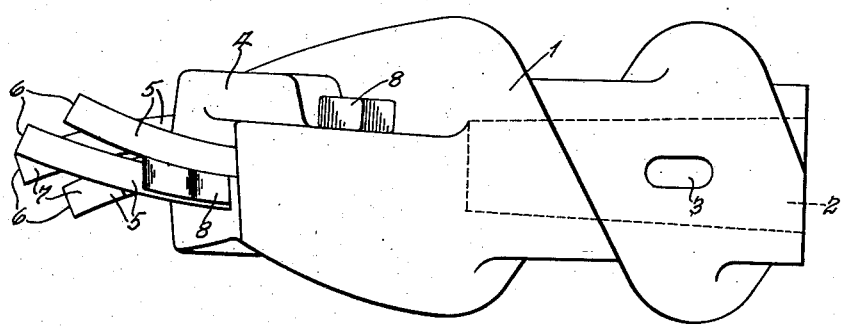
Fig. 2.
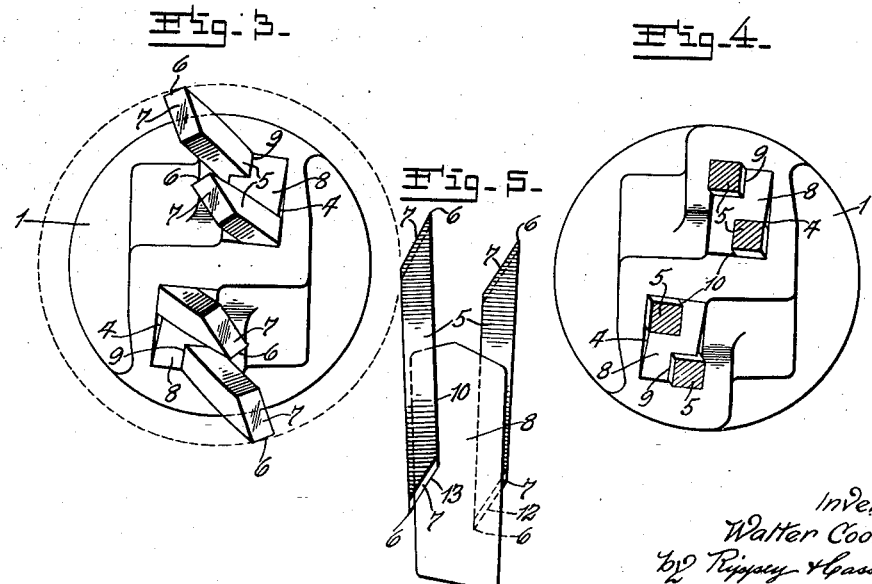
Fig. 3.   Fig. 4.
Fig. 5.
Inventor
Walter Cook
by Rippey & Cassidy
His Attorneys

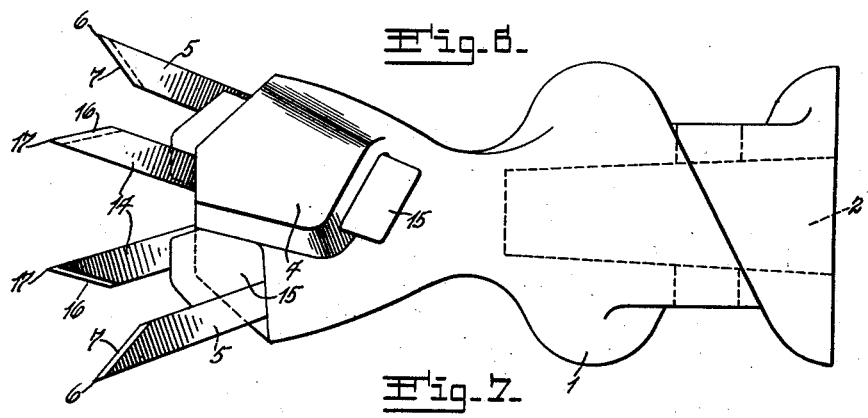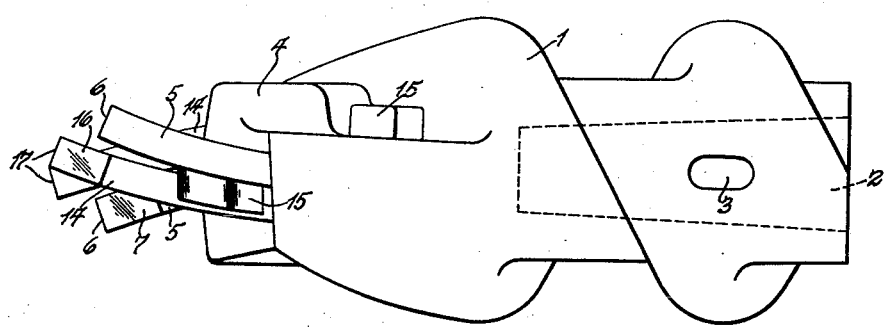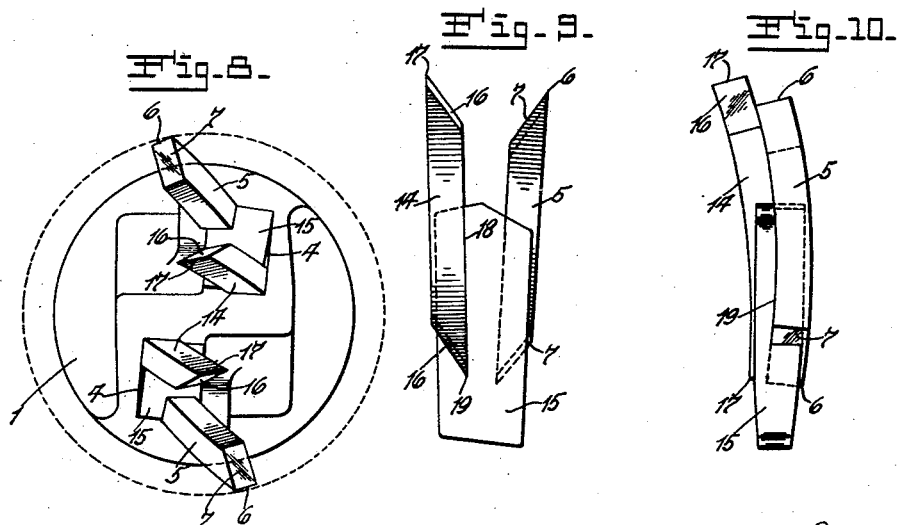

April 1, 1941.  W. COOK  2,237,133
MINING DRILL AND BIT
Original Filed Feb. 21, 1936   3 Sheets-Sheet 3

Inventor
Walter Cook
by Rippey & Cassidy
His Attorneys.

Patented Apr. 1, 1941

2,237,133

UNITED STATES PATENT OFFICE 2,237,133

MINING DRILL AND BIT

Walter Cook, Benton, Ill., assignor to Central Mine Equipment Co., St. Louis, Mo., a corporation of Missouri Application February 21, 1936, Serial No. 65,054
Renewed August 11, 1939

15 Claims. (Cl. 255—69)

This invention relates to mining drills and bits.

Objects of the invention are to provide an improved mining drill that operates more easily than other mining drills with which I am familiar and which are applied to the same uses, and that requires less power for operation; to provide improved bits of novel construction and form having relatively sharp cutting edges at their forward ends and means for holding the bits in connection with the forward end of the drill in a distinctly novel relationship so that the bits will last longer, reduce the amount of power required for operation of the drill, diminish the abrasive action of the mineral on the bits, and operate in a manner whereby the drilling action tends to sharpen the bits to a certain extent at least; to provide a mining drill with bits of improved construction and form that will drill holes with smoother walls than are drilled by other drills with which I am familiar and are applied to the same uses, and which will drill holes of approximately uniform diameter throughout their length and depth and which will also drill straighter holes than the conventional drills; to provide an improved drill equipped with bits assembled in a relationship that will diminish the vibration of the drill during operation; to provide bits for a mining drill that resist bending and breaking tendencies while at the same time reducing the amount of power required for operation; to provide an improved mining drill that will operate faster than other mining drills with which I am familiar so that the operator may drill more holes per day than can be drilled by other drills; to provide a drill head equipped with bits assembled in a novel relationship that will to a great extent protect the drill head from wearing and thereby considerably prolong the utility of the drill head; and to provide improved wedges for holding the improved bits in proper relationship to each other and to the drill head.

Other objects and many advantages of my improved drill and bits will be made apparent by the following description, reference being made to the annexed drawings in which—

Fig. 1 is a side elevation of a drill head equipped with my improved bits.

Fig. 2 is a side elevation at right angles to that shown in Fig. 1.

Fig. 3 is an end elevation.

Fig. 4 is a view similar to Fig. 3 having the bits shown in section.

Fig. 5 is a view showing one of the wedges and two bits in connection therewith detached from the drill head.

Fig. 6 is a side elevation of a drill head having the bits assembled in a different relationship from that shown in the preceding views of the drawings.

Fig. 7 is a side elevation at right angles to that shown in Fig. 6.

Fig. 8 is an end elevation of a drill head and bits as shown in Figs. 6 and 7.

Fig. 9 is a side elevation of a wedge and bits in connection therewith in the relationship shown in Fig. 6.

Fig. 10 is a side elevation at right angles to that shown in Fig. 9.

Figs. 11 to 18 inclusive show four different forms of bits.

Figure 19:
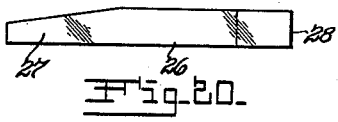

Fig. 19 shows a bit stock before it is bent to curved form.

Figure 20:
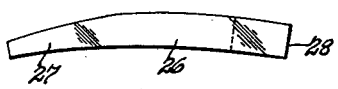
Figure 21:

Figs. 20 and 21 show the curved bit made from the stock shown in Fig. 19, and which is for use in substitution for any of the bits 5.

Figure 22:
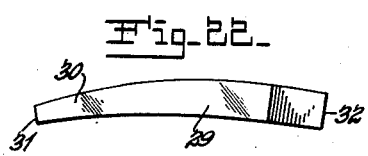
Figure 23:
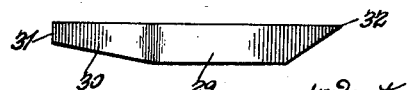

Figs. 22 and 23 are elevations of a bit for use in substitution for the bits 14 and 23.

The detachable drill head or end member 1 of the auger is formed with the socket 2 attached and designed to receive an extended portion of the main part of the auger and has a keyhole 3 to receive a key whereby the head or end 1 is rigidly attached to said extended portion of the main part of the auger.

In the specific construction shown the forward end of the head or end member 1 is provided with two sockets 4 which are inclined relative to the axis of the drill. These sockets incline outwardly from their rear ends which are open and also incline forwardly in the direction in which the drill is rotated when in use. These sockets are provided to receive the rear ends of the bits and also to receive wedges whereby the bits are rigidly attached to the head or end 1.

The bits are of novel construction each comprising an elongated arcuate body 5 that curves forwardly. The body 5 curves uniformly and symmetrically throughout its length and has on each end a cutting edge 6 formed by parallel bevels 7 so that the edges 6 on each bit are at opposite sides thereof. The edges 7 are approximately radial with respect to the curvature of the bits. These bits, in the arrangement shown in Figs. 1, 2 and 3 have their cutting edges 6 at their forward ends at the outer sides of the bits. The length of the cutting edges is in the general direction of rotation of the drills. Due to the fact the bits curve forwardly while the bevels 7 at the forward ends of the bits extend outwardly from the inner sides of the bits to intersection with the outer sides thereof, the cutting edges 6 are inclined in the manner shown in Fig. 2, the rear ends of the cutting edges extending forwardly beyond the opposite ends thereof. Due to the inclination of the sockets 4 in which the bits are wedged the forward ends of the outer bits are spaced apart a distance sufficiently greater than the diameter of the head or end 1 and of the auger or drill, and cut a hole of greater diameter than the diameter of the drill auger so that the loose material may easily be worked out of the hole by rotation of the drill or auger.

The bits of each pair of bits are held in the socket into which they extend by a wedge comprising a tapered body 8 which is longer than the socket in which it is driven so that the forward end of the wedge extends forwardly beyond the socket and the rear end extends beyond the rear end of the socket. The bits and wedge are driven into the socket from the forward end of the socket which tapers rearwardly unto the wedges and the bits are wedged tightly in the socket leaving the rear end of the wedge extending beyond the socket, so that it may be struck by a hammer or other device and driven forwardly out of the socket when desired.

As shown each wedge 8 has in its forward outer portion a groove or notch 9 of less depth and less width than the thickness of the bit 5. And each wedge has in its opposite side a groove or notch 10 also of less depth and less width than the thickness of the bit 5. The rear end of the groove or notch 9 terminates at an inclined wall 12 forming a tapered socket to receive the sharp inner end of the outer bit. The inner end of the notch 10 terminates at an outwardly and rearwardly inclined wall 13 against which the bevelled wall 7 of the inner end of the inner bit seats.

When the bits are placed in the grooves or notches 9 and 10 they completely fill said grooves or notches and extend somewhat beyond both adjacent surfaces of the wedge. The wedge and the bits assembled in connection therewith are then driven rearwardly into one of the sockets 4 until the bits are tightly clamped against the walls of the socket, the wedge assuming a somewhat twisted position in the socket as shown in Fig. 4. The rear ends of the bits do not extend rearwardly beyond the socket but are wholly confined in the socket. The wedge 8 extending considerably beyond the forward end of the socket supports and braces the outer bit for a distance beyond the socket.

In the construction and arrangement shown on sheet 2 of the drawings the parts are the same as already described with the exception of the inner bits 14, and the grooves or notches in the wedges 15 which receive said inner bits. The same reference numerals are applied to parts and features on Sheet 2 of the drawings that are identical with their analogues shown on Sheet 1.

The inner bits 14 have their bevelled end walls 16 inclining in the opposite direction from the bevelled walls 7 on the outer bits 5 so that the forward cutting edges 17 of the inner bits are at the inner sides of said bits. The groove or notch 18 in the wedge 15 that receives the inner bit terminates in a tapered socket formed by an outwardly inclined wall 19 so that the bevelled wall 16 at the rear end of the inner bit seats closely against said wall 19 (Fig. 9). As shown the bevelled walls 16 of the inner bits diverge from the bevelled walls 7 of the outer bits. In this construction the cutting edges of the outer bits are spaced apart a distance considerably greater than the diameter of the head or end member 1 for the purposes already described. As shown in Fig. 10, which for this purpose may also be considered illustrative of the wedge walls in Figs. 1 to 5 inclusive, the walls of the notches against which the curved sides of the bits seat are curved in conformity with the curvature of the bits, thereby supporting and strengthening and clamping the bits throughout their portions that overlap the wedges.

Figure 11:
Figure 12:
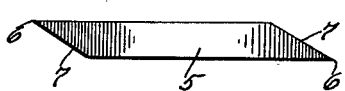

One of the bits 5 is shown in detail apart from its associated elements in Figs. 11 and 12.

Figure 13:
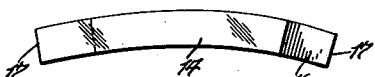
Figure 14:
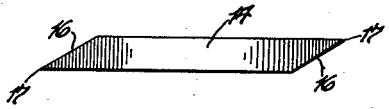
Figure 15:
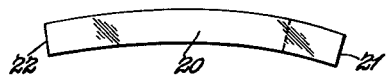
Figure 17:
Figure 16:
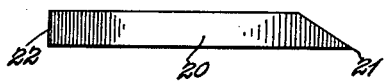
Figure 18:
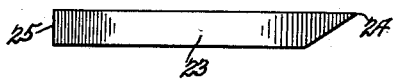

One of the bits 14 is shown apart from its associated elements in Figs. 13 and 14.

It should be apparent that these bits, each of which has cutting edges on its opposite ends, are designed and adapted and intended for use in reversed positions. Which is to say that after one end of a bit becomes dulled or worn so that it will not cut properly the wedge may be driven out of its socket, and the bit reversed so as to extend the sharp cutting edge thereof beyond the wedge and place the dulled or worn end of the bit in the wedge and thus obtain a use of the bit for double the time that it could be used if it were provided with only one cutting edge.

However, it is within the scope of the invention relating to the bit as well as the drill to provide a bit 20 (Figs. 15 and 16), with a cutting edge 21 similar to the cutting edges 6 or 17 on one end only leaving the opposite end 22 blunt and without a cutting edge. The bit is curved the same as the bits 5 and 14 and the cutting edge 21 extends forwardly beyond the wedge while the end 22 of the bit that is blunt without a cutting edge is wedged in the socket by the wedge.

Similarly in substitution for the bit 14 an arcuate bit 23 (Figs. 17 and 18) may be provided with a cutting edge 24 on one end only while the opposite end 25 is blunt and without a cutting edge. These bits 23 are curved and are otherwise precisely the same as the bits 14, excepting that the said bits 23 have a cutting edge 24 at one edge only.

Another form of bit is shown in Figs. 20 and 21, the same comprising an arcuate body 26 formed with a tapered portion 27 at one end and a cutting edge 28 at the opposite end. Thus the bit 26 instead of being of approximately uniform width and thickness has a tapered wedging portion 27 at one end adapted to be engaged in a similarly shaped groove or notch in a wedge which should be understood without specific and definite illustration of the wedge. In Fig. 19 the bit stock is shown unbent, whereas in Figs. 20 and 21 the wedge is shown in its bent or curved form similar to the bits already described. The bit shown in Figs. 20 and 21 is designed and adapted to be used in substitution for any of the bits 5.

Figs. 22 and 23 illustrate a bit designed and adapted for use in substitution for the bits 14 and 23. Said bit comprises an elongated arcuate body 29 having a tapered portion 30 at one end and which terminates in a blunt wall 31. The opposite end of this bit is formed with a sharp cutting edge 32 functioning the same as the cutting edges 17 and 24. This bit may be clamped in the socket of the drill by any appropriate wedge.

It should now be apparent that I have provided an improved drill and improved bits for use in connection with the drill head and that operate in an easier manner and otherwise attain all of the intended objects and purposes of the invention. I do not limit myself to the exact forms illustrated and described, but contemplate such variations as may be found desirable without departure from the nature and principle of the invention.

I claim:

1. In a mining drill having a pair of sockets in its forward end, a wedge removably mounted in each of said sockets and each having a notch in one side provided with two side walls and having its inner end terminating in a tapered socket having three walls, two of which are continuations of the two walls of said notch and the third of which inclines outwardly toward the forward end of the wedge from intersection with a continuation of one of the walls of said notch to intersection with one side of said wedge forwardly beyond the inner end of said socket, and bits extending into said first named sockets and seated in said notches in said wedges and being of greater thickness than the width of one of said walls of said notches in said wedges and extending beyond the sides of said wedges and having tapered inner ends fitting in said tapered sockets and having cutting edges on their outer ends beyond said wedges, the length of said cutting edges extending generally in the direction of rotation of the drill.

2. A bit of the character described comprising an elongated arcuate body curving symmetrically throughout its length and having its shorter radius of curvature on its forward side and having its inner and outer sides approximately rectilinear, and having a wall on one end inclining from intersection with one of said last named sides to intersection with the other one of said last named sides and forming an approximately radial cutting edge having its length extending generally in the direction of movement of the bit when the bit is operated.

3. A bit of the character described comprising an elongated arcuate body curving symmetrically throughout its length and having its shorter radius of curvature on its forward side and having its inner and outer sides approximately parallel and rectilinear, and having approximately parallel walls on its ends inclining from intersection with said last named sides respectively to intersection with the other respective one of said last named sides, and forming approximately radial cutting edges on the respective ends of said body having their lengths extending generally in the direction of movement of the bit when the bit is operated.

4. In a mining drill having sockets in its forward end, forwardly curved bits having rectangular cross-sectional rear end portions extending within said sockets and having forward end portions of approximately uniform transverse diameters projecting forwardly and curving in the direction of rotation of the drill and having inclined walls on their outer ends certain of which extend outwardly from intersection with their inner side walls to intersection with their outer side walls, and having cutting edges on their outer ends respectively extending lengthwise in the direction of rotation of the drill.

5. In a mining drill having sockets in its forward end, forwardly curved bits having rectangular cross-sectional rear end portions extending within said sockets and having forward end portions of approximately uniform transverse diameters projecting forwardly and curving in the direction of rotation of the drill and having inclined walls on their outer ends certain of which extend outwardly from intersection with their inner side walls to intersection with their outer side walls, said inclined walls providing approximately radial cutting edges on the forward ends of said bits, the lengths of which cutting edges extend generally in the direction of rotation of said drill.

6. In a mining drill having sockets in its forward end, forwardly curved bits having approximately rectangular cross-sectional rear end portions extending within said sockets and having rectangular forward end portions of approximately uniform transverse diameters projecting forwardly and curving in the direction of rotation of the drill and having inclined walls on their outer ends extending outwardly from intersection with their inner side walls to intersection with their outer side walls, and having elongated cutting edges radial to the curvature of the drill along their outer sides at their forward ends and extending lengthwise in the direction of rotation of the drill.

7. In a rotary mining drill, interchangeable bits each comprising an elongated arcuate body curving forwardly symmetrically throughout its length and having its inner and outer sides approximately parallel and rectilinear, and each having a wall on one end inclining forwardly from intersection with one of said last named sides to intersection with the other one of said last named sides and forming an approximately radial cutting edge the length of which extends generally in the direction of rotation of the drill.

8. In a rotary mining drill, interchangeable bits each comprising an elongated arcuate body curving forwardly symmetrically throughout its length and having its inner and outer sides approximately parallel and rectilinear, and having approximately parallel walls on its ends inclining from intersection with the respective ones of said last named sides to intersection with the opposite side, and forming approximately radial cutting edges on said last named sides having their lengths extending generally in the direction of rotation of the drill.

9. In a rotary mining drill, interchangeable bits each comprising an elongated arcuate body curving forwardly symmetrically throughout its length and having its inner and outer sides approximately parallel and rectilinear, and having approximately parallel walls on its ends inclining from intersection with the respective ones of said last named sides to intersection with the opposite side, and forming approximately radial cutting edges on said last named sides having their lengths extending generally in the direction of rotation of the drill, said bits being reversible in connection with the drill, and means for attaching said bits to the drill in a relationship in which they diverge forwardly.

10. A bit of the character described for a rotary mining drill, comprising an elongated arcuate body having its shorter radius of curvature on its forward side, an approximately radial cutting edge on one end of said body having its length extending generally in the direction of movement of the bit when the bit is operated and having its opposite end blunt and adapted to be inserted in a drill socket.

11. A bit for a rotary mining drill comprising an elongated arcuate body tapering toward one end, an approximately radial cutting edge on the opposite end of said body having its length extending the full width thereof and generally in the direction of movement of the bit when the bit is operated.

12. In a rotary mining drill having sockets in its forward end, bits having their rear ends attached within said sockets and their forward ends beyond said sockets and curving in the direction of rotation of the drill, and elongated approximately radial cutting edges along the inner sides of said bits at their forward ends having their lengths extending generally in the direction of rotation of the drill.

13. In a rotary mining drill, a head having sockets in its forward end, a pair of bits having their rear ends secured within each socket and their forward ends curving beyond the drill head, and relatively long approximately radial cutting edges at the outer sides of the forward ends of said bits having their lengths extending generally in the direction of rotation of the drill.

14. A rotary mining drill having sockets in its forward end, and a pair of bits having their rear ends secured within each socket and their forward ends curving beyond said sockets in the direction of rotation of the drill, one bit of each pair of said bits having an approximately radial cutting edge the full width thereof at the outer side of said forward end and the other bit of each pair of bits also being provided with an approximately radial cutting edge at its forward end, the length of all of said cutting edges extending generally in the direction of rotation of the drill.

15. A rotary mining drill having sockets in its forward end, and a pair of bits having their rear ends secured in each socket and their forward ends curving beyond the end of said drill, one bit of each pair of said bits having an approximately radial cutting edge along its outer side and the other bit of each pair of bits having an approximately radial cutting edge along its inner side, the lengths of both of said cutting edges extending generally in the direction of rotation of the drill.

WALTER COOK.